(No Model.) 3 Sheets—Sheet 1.
O. B. HARDY.
APPARATUS FOR MAKING EXPLOSIVE COMPOUNDS.
No. 306,920. Patented Oct. 21, 1884.
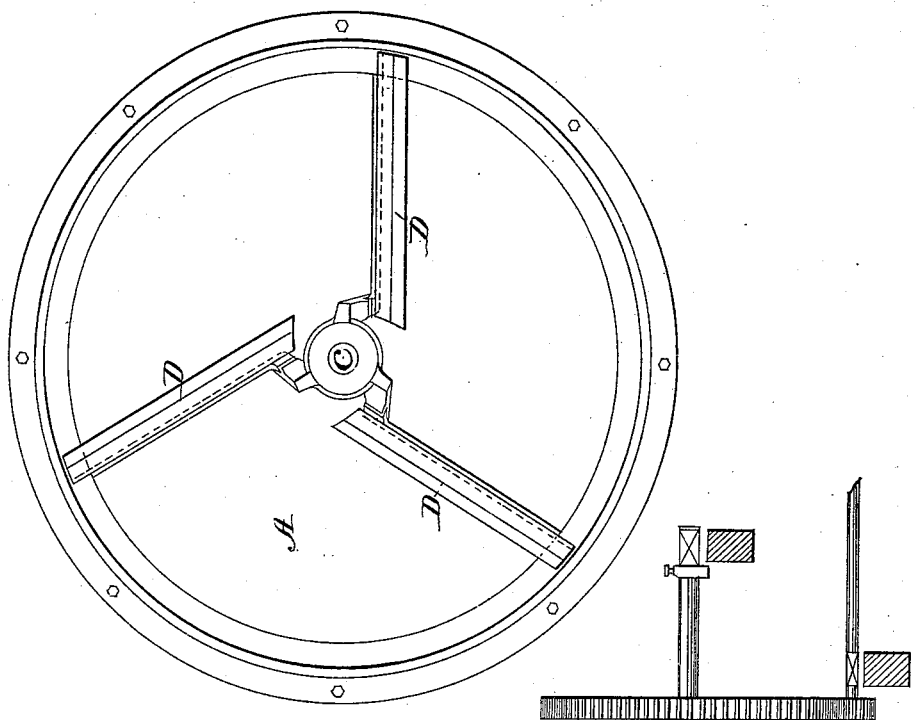
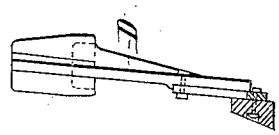
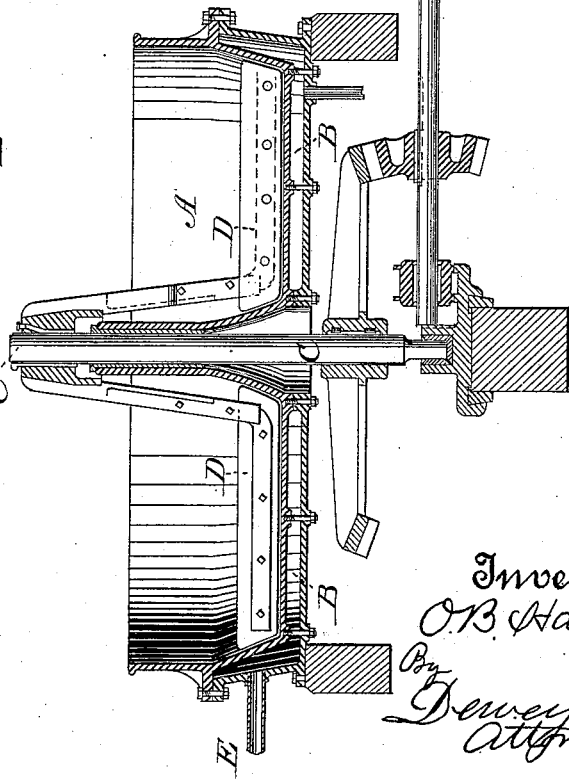
Witnesses,
Geo. H. Strong.
G. H. Strong
Inventor,
O. B. Hardy
By Dewey & Co.
Attorneys (No Model.) 3 Sheets—Sheet 2.
O. B. HARDY.
APPARATUS FOR MAKING EXPLOSIVE COMPOUNDS.
No. 306,920. Patented Oct. 21, 1884.
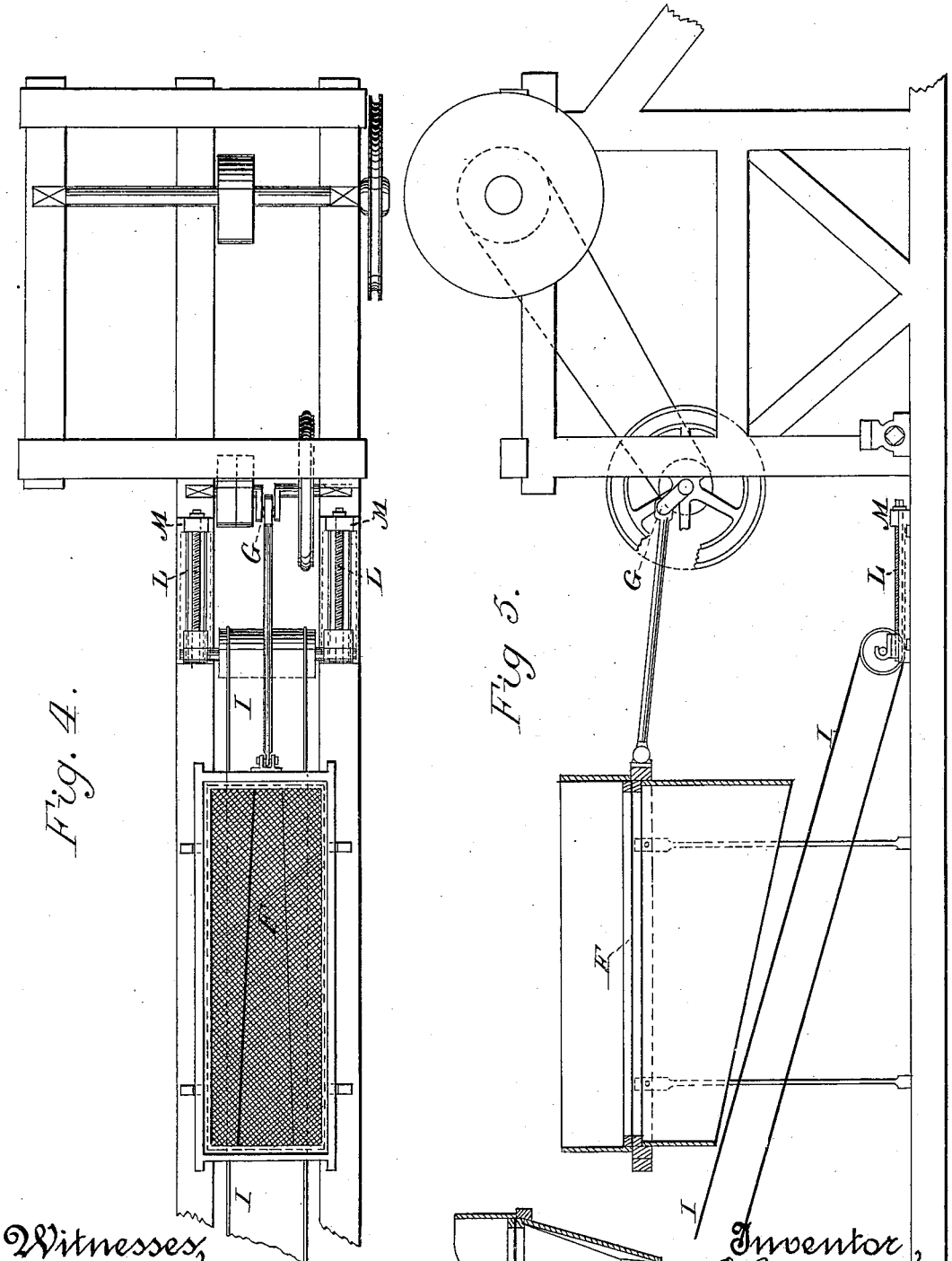

(No Model.) 3 Sheets—Sheet 3.
O. B. HARDY.
APPARATUS FOR MAKING EXPLOSIVE COMPOUNDS.
No. 306,920. Patented Oct. 21, 1884.
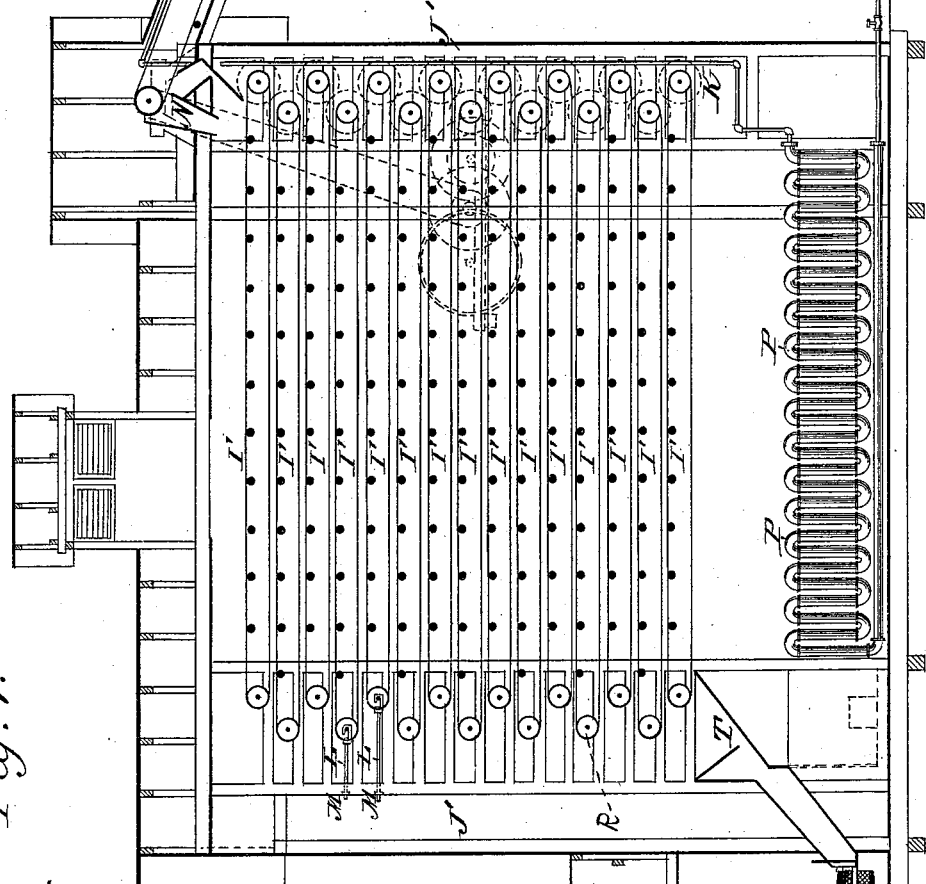
Inventor,
O. B. Hardy
By Dewey & Co.
attorneys
Witnesses,
Geo. H. Strong
G. H. Krouse

UNITED STATES PATENT OFFICE.

ORLANDO B. HARDY, OF SAN FRANCISCO, CALIFORNIA, ASSIGNOR TO THE GIANT POWDER COMPANY, OF SAME PLACE.

APPARATUS FOR MAKING EXPLOSIVE COMPOUNDS.

SPECIFICATION forming part of Letters Patent No. 306,920, dated October 21, 1884.

Application filed June 6, 1883. (No model.)

*To all whom it may concern:*

Be it known that I, ORLANDO B. HARDY, of the city and county of San Francisco, State of California, have invented an Improved Apparatus for Making Explosive Compounds; and I hereby declare the following to be a full, clear, and exact description thereof.

My invention relates to an improved apparatus which is used in the manufacture of explosive compounds, these improvements relating more especially to the drying apparatus which is used after the mixing has been completed, which will be more fully explained by reference to the accompanying drawings, in which—

Figure 1, Sheet 1, is a view of the mixing and grinding pan, showing a vertical section through the center. Fig. 2 is a top view of the pan with its arms or grinders. Fig. 3 is a separate view of one of the arms. Fig. 4, Sheet 2, is a plan view of the granulating hopper and screen with its actuating mechanism. Fig. 5 is a side elevation showing a vertical section of the hopper. Fig. 6 is a transverse section of the hopper. Fig. 7, Sheet 3, is a vertical longitudinal section of the drying apparatus. Fig. 8 is a view of the tension apparatus for the belts. Fig. 9 is a view of the spreader or distributer.

The ingredients for the manufacture of my powder are sulphur, carbon in any suitable form, nitrate of soda, nitrate of potash, and a small quantity of sugar or glucose. The sulphur and charcoal or carbon may be pulverized by placing them, mixed in the proper proportions, in an iron barrel or cylinder supported upon a horizontal shaft and having an opening in one side, with a suitable cover, through which the materials may be introduced and removed. Iron balls or large stones may be introduced with the sulphur and carbon, and the whole revolved together until these materials have been reduced to an impalpable powder. I have not shown this barrel, as it is well known for the purpose. The nitrate of soda and the nitrate of potash in the desired proportions are placed in an iron pan, A, which has a double bottom, the outer one being bolted on, so as to form a steam-tight chamber, B, beneath and around the sides. Through a central cone a vertical shaft, C, projects to a height above the cone to receive the hub of a set of arms or stirrers, D. Below the pan is a bevel-gear, by which the vertical shaft and the stirrers are driven, in the usual manner.

The arms D may be made of wood or iron, and have iron shoes placed at an angle and extending radially toward the outside, so that when they are moved over the bottom of the pan they act to pulverize the material and assist to reduce it to the desired state of solution.

E is a steam-pipe, through which steam under a pressure of about eighty pounds is admitted to the chamber beneath the pan, to assist in dissolving the contents. About two per cent. of sugar or one per cent. of glucose is added to the nitrate of soda and nitrate of potash, and a sufficient quantity of water to dissolve these materials. The stirrers or grinders are then set in motion, and the grinding is carried on until the whole is thoroughly dissolved, which usually takes about one hour. The pulverized sulphur and carbon are then added, and the mixing carried on until these ingredients are thoroughly incorporated with the solution and the whole forms a thick, homogeneous, dryish paste. When the sulphur and carbon are added, the steam is shut off from pipe E, and a stream of cold water is admitted to circulate beneath the pan, escaping through a pipe in the bottom. This reduces the temperature of the mass to avoid danger of explosion after the sulphur and carbon are added. When the mixing is complete, the stiff dryish paste is placed in a hopper the bottom of which is a screen, F, having meshes which will produce grains of any desired size when the powder is put through them. Screens of different sizes may be employed, each being mounted in a frame, so that one may be removed and another put in place. From the end of the screen-frame a pitman extends to a crank, G, upon a shaft, which is driven by pulleys and belts from any suitable source of power. This crank makes from one hundred and fifty to two hundred revolutions per minute, and as the powder-paste is forced through the screen it is separated into grains and falls upon the lower end of an inclined upwardly-traveling belt, I, which extends beneath the hopper and screen. This belt extends upward to a point above the uppermost of a series of horizontal traveling belts, I', and is inclosed in a casing, J, through which it travels, and in which also are one or more steam-pipes, K, to again elevate its temperature and assist in drying it. The tension of the belt I is maintained by means of screws L, which are fixed in a horizontal position, so that one end may pass through nuts M, which travel in guides parallel with the screws. The nuts M have extension pieces upon each side of the screws L, and at the forward end of these extensions boxes are provided for the reception of the journals of the drum-shaft, around which the belt passes. By turning the screws, the nuts and boxes, and with them the shaft, may be drawn back, so as to tighten the belt to any desired tension. The belts I' are adjusted by a similar device. The granular material, falling upon this belt, is carried up through the heated casing J and discharged from it upon the uppermost of the horizontal belts I'.

For convenience in operating the granulating-sieves and to reduce the expense of so long a belt, I make the belt I only from fourteen to twenty inches wide; but the drying-belts I' are preferably made four feet or more in width.

In order to distribute the powder properly upon these wider belts, it is discharged from the upper end of the belt I over an inclined surface, N, which diverges toward the bottom, and has diverging strips O fixed to its surface, so that as the powder passes down over the surface it will be spread out and deposited upon the wider belt I', so as to be evenly spread over its full width. At the opposite end the next belt below projects a short distance beyond the discharge end of this upper belt, so that when the powder arrives at this point it will fall upon this next belt below, and will be returned by it to fall upon the next succeeding belt, and thus alternately from one belt to another until it reaches the bottom. These belts are driven by suitable belt-pulleys or gear-wheels, by which motion is communicated to them simultaneously, and they are all caused to move in the proper direction and at a rate of speed which will allow the powder to become thoroughly dried before it is discharged from the lower belt. Two hours is a very suitable length of time; but this may be varied to suit circumstances. A coil or series of steam-pipes, P, may be arranged within or through the building to produce as much heat as is necessary or desirable for drying the powder. I have found that from 160° to 180° Fahrenheit is very suitable for the purpose.

In order to make these carrying-belts run properly, they are formed of canvas and have a rope secured to each edge, and sometimes through the center also. The rollers R at each end, over which these belts run, may be straight, when ropes are fixed to the edges only of the belts; but I have found that if they are made of a slightly-larger diameter in the center than at the ends the belts will run better, and when the central rope is used a groove will be turned in each roller to receive and guide it, and this keeps the belts running in place properly. As the powder is discharged from the final belt I' it is allowed to run over an inclined screen, T, through which the fine dust passes, while the grains are discharged into a conoidal screen, U, which turns upon a horizontal shaft, and may have screen-surfaces of different sized meshes surrounding it, so as to form sections from one end to the other. As it rotates the grains travel slowly along its lower inclined side while being turned by the rotation, the finer grains passing through the first section and the others through the following sections until the largest have passed. Each size may be received into a suitable receptacle below, and transferred thence to undergo the operation of polishing and glazing, or if it is to be mixed with nitro-glycerine it is removed to the tub or vat where this mixing takes place. By this combination of a shaking-screen for granulating the pasty mass from the mixer and discharging it directly upon the traveling belts, it is not necessary to handle it until the operation is entirely completed, and the grains, being kept in motion and dropped periodically from one belt to the other, are prevented from adhering before they become dry.

I am aware that horizontal traveling belts have been used for drying purposes, and I do not claim, broadly, such belts; but What I do claim, and desire to secure by Letters Patent, is—

1. In the manufacture of explosive compounds, an apparatus for granulating and drying the pasty mass made in the mixer, consisting of a shaking screen or sieve having a plane bottom through which the mass is passed, and an endless apron below said screen, adapted to receive the grains as formed and to elevate them to and discharge them upon the first of a series of traveling endless belts, arranged in the described relation to each other, whereby the grains are deposited from one upon the other and transported throughout the whole series, and thus agitated until dry, substantially as described.

2. The traveling belt I I', passing over drums the shafts of which are supported in boxes, said boxes being connected to the frame by rods L, screw-threaded upon their ends and provided with nuts M, whereby the tension of the said roll-shafts may be adjusted, substantially as described.

3. In an apparatus for drying, the inclined carrying-belt I and the wider horizontal drying-belts I', in combination with a spreader or distributer, O, substantially as herein described.

4. In a powder-drying apparatus, the endless traveling belts I and the wider horizontal drying-belts I', in combination with the screen T and the screening or sizing device U, substantially as herein described.

In witness whereof I have hereunto set my hand.

ORLANDO B. HARDY.

Witnesses:
G. W. EMERSON,
S. H. NOURSE.